United States Patent
Hoyland et al.

(10) Patent No.: US 9,598,978 B2
(45) Date of Patent: Mar. 21, 2017

(54) FAN CONTAINMENT SYSTEM

(71) Applicant: ROLLS-ROYCE PLC, London (GB)

(72) Inventors: Matthew Ashley Charles Hoyland, Chesterfield (GB); Dale Edward Evans, Derby (GB)

(73) Assignee: ROLLS-ROYCE plc, London (GB)

( * ) Notice: Subject to any disclaimer, the term of this patent is extended or adjusted under 35 U.S.C. 154(b) by 664 days.

(21) Appl. No.: 14/154,671

(22) Filed: Jan. 14, 2014

(65) Prior Publication Data

US 2014/0227076 A1    Aug. 14, 2014

(30) Foreign Application Priority Data

Feb. 13, 2013 (GB) .................................. 1302492.2

(51) Int. Cl.
| | | |
|---|---|---|
| *F01D 21/04* | (2006.01) | |
| *F02C 7/05* | (2006.01) | |
| *F02C 7/04* | (2006.01) | |

(52) U.S. Cl.
CPC .............. *F01D 21/045* (2013.01); *F02C 7/04* (2013.01); *F05D 2250/25* (2013.01); *Y02T 50/672* (2013.01)

(58) Field of Classification Search
CPC ............ F01D 21/045; F02C 7/04; F02C 7/05
USPC ............................................................ 415/9
See application file for complete search history.

(56) References Cited

U.S. PATENT DOCUMENTS

| | | | | | |
|---|---|---|---|---|---|
| 4,475,864 | A | * | 10/1984 | Patacca ................. | F01D 21/045 138/109 |
| 4,534,698 | A | * | 8/1985 | Tomich ................. | F01D 21/045 415/121.2 |
| 4,598,449 | A | * | 7/1986 | Monhardt ............. | F01D 21/045 219/121.13 |
| 5,259,724 | A | * | 11/1993 | Liston ................... | F01D 21/045 415/119 |

(Continued)

FOREIGN PATENT DOCUMENTS

| | | |
|---|---|---|
| EP | 2 290 199 A2 | 3/2011 |
| EP | 2290196 A2 | 3/2011 |
| EP | 2 305 985 A2 | 4/2011 |

OTHER PUBLICATIONS

Jul. 19, 2013 Search Report issued in United Kingdom Patent Application No. GB1302492.2.

(Continued)

*Primary Examiner* — Sean J Younger
(74) *Attorney, Agent, or Firm* — Oliff PLC (57) ABSTRACT

A fan containment system having a generally cylindrical fan case including a hook projecting in a generally radially inward direction and positioned axially forward of a radial array of fan blades; a fan track liner disposed on the radially inner surface of the fan case; and a panel which is positioned axially rearward of the hook and positioned axially forward of the radial array of fan blades and forms a substantially continuous air washed surface with the fan track liner. The panel is temporarily deformable so as to absorb the impacts of any foreign bodies, which enter the gas turbine engine, without compromising the structural integrity of the panel while being weak enough so that in the event that one of the fan blades is released from the hub, the fan blade tip of the detached fan blade is not inhibited from moving radially outward of the hub.

16 Claims, 7 Drawing Sheets

(56) References Cited

U.S. PATENT DOCUMENTS

| | | | |
|---|---|---|---|
| 5,482,429 A * | 1/1996 | Penda | F01D 21/045 415/119 |
| 6,765,864 B1 | 7/2004 | Natarajan et al. | |
| 6,830,428 B2 | 12/2004 | Le Biez et al. | |
| 7,255,528 B2 * | 8/2007 | Stretton | F01D 21/045 415/119 |
| 7,338,250 B2 | 3/2008 | Martindale et al. | |
| 7,914,251 B2 * | 3/2011 | Pool | F01D 21/045 415/119 |
| 8,231,328 B2 * | 7/2012 | Reed | F01D 21/045 415/174.4 |
| 2005/0089391 A1 | 4/2005 | Stretton | |
| 2007/0297910 A1 | 12/2007 | Pool et al. | |
| 2008/0044273 A1 | 2/2008 | Khalid | |
| 2011/0044806 A1 * | 2/2011 | Harper | F01D 21/045 415/182.1 |
| 2011/0076132 A1 * | 3/2011 | Bottome | F01D 21/045 415/9 |
| 2011/0211943 A1 | 9/2011 | Belbeck et al. | |

OTHER PUBLICATIONS

Search Report issued in European Patent Application No. 14 15 1153 dated Apr. 3, 2014.
Aug. 25, 2016 Office Action issued in European Patent Application No. 14151153.5.

\* cited by examiner

FAN CONTAINMENT SYSTEM

FIELD OF INVENTION

The present invention relates to gas turbine engines. In particular, the present invention relates to a fan containment system for a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core, although in an alternative configuration the fan may be driven via a gear chain from a turbine.

The fan comprises an array of radially extending fan blades mounted on a rotor and will usually provide upwards of seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

The fan is surrounded by a fan containment system and is typically located at the front end of the gas turbine engine. Located in an upstream position, the fan and fan containment system is expected to be capable of withstanding the rigours of normal operation without any, or only minor, damage, such that the performance of the engine is not inhibited.

The ingestion of smaller foreign objects, of which the most commonly encountered are ice fragments or chunks, is one of the routine hazards that the engine is expected to cope with during normal operation. Any such minor damage caused by ice is expected to be capable of repair during routine maintenance.

In the event that the engine ingests larger foreign objects, the engine may no longer be expected to continue operating normally and providing thrust. However, it is expected that during such an incident that the engine, and in particular the fan and fan containment system, must withstand the impact in so far as to protect the rest of the aircraft from sustaining damage, which could endanger the safety of those on board the aircraft. Any sustained damage could also compromise the airworthiness of the aircraft.

Although a rare occurrence, the most likely example of a larger foreign object ingested by an engine will be a bird. In the extreme case, ingestion of a bird or other large foreign object for example, may cause a fan blade to be released from the rotor. A fan blade may also be released as a result of fatigue cracks, although the probability of such an occurrence is very low.

In such an event the fan containment system must be designed to contain the released fan blade so as to minimise damage to the aircraft and its vital operating systems. The fan containment system therefore has a dual purpose of forming a portion of the outer duct of the fan system and retaining detached fan blades in the event of catastrophic failure.

The major component of the fan containment system is a fan case. It is known to construct the fan case as a generally cylindrical or frustoconical containment ring surrounding the fan. The fan case may not be strictly cylindrical and may follow, from front to back, the profile of the tips of the fan blade in the axial direction of the fan. It is known to provide relatively thick metal containment rings to ensure containment of a released fan blade. It is also known to provide locally thickened isogrid metallic containment rings. Furthermore, it is also known to wrap a fibrous material such as Kevlar around a relatively thin metallic containment ring. In the event that a fan blade is released from the rotor and passes through the relatively thin metallic containment ring, the fibrous material contains the fan blade.

Figure 2:
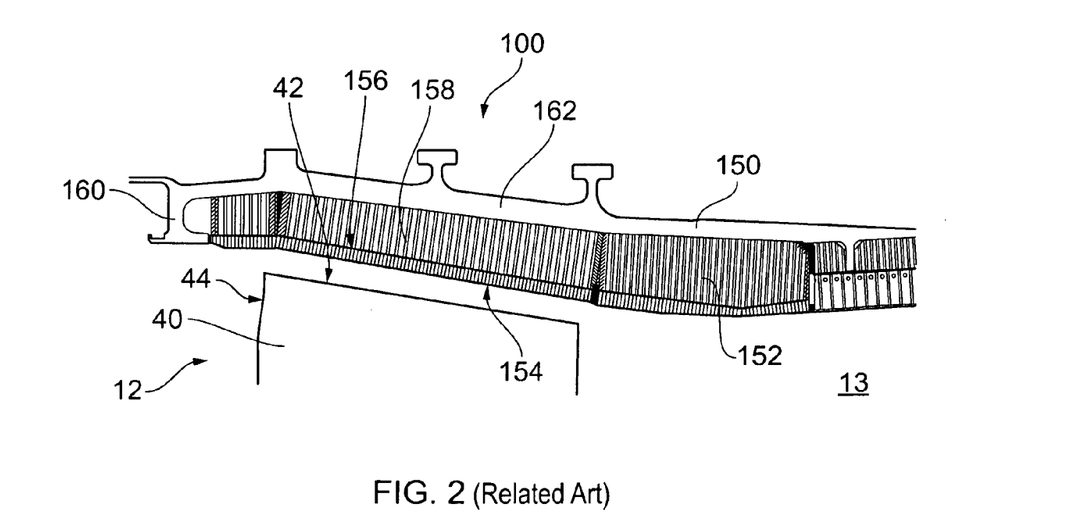
FIG. 2 is a detailed partial view of a cross-section through a typical fan case arrangement of a gas turbine engine.

Conventionally, it is necessary to provide a fan track liner between the fan and the fan case. FIG. 2 illustrates a conventional fan containment arrangement 100 which includes such a fan track liner 152. The fan containment arrangement 100 surrounds a fan 12 comprising an array of radially extending fan blades 40. Each fan blade 40 has a leading edge 44 and fan blade tip 42. The fan containment arrangement 100 comprises a fan case 150. The fan case 150 has a generally frustoconical or cylindrical containment portion 162 and a hook 160. The hook 160 is positioned axially forward of the array of radially extending fan blades 40. The fan track liner 152 is mechanically fixed or directly bonded to the fan case 150. The fan track liner 152 may be adhesively bonded to the fan case 150. The fan track liner 152 is provided as a structural filler to bridge a deliberate gap provided between the fan case 150 and the fan 12. Filling the gap with a typical fan track liner 152 construction aids containment of a released fan blade 40 and accommodates the out of balance forces experienced by the fan 12 in the aftermath of the fan blade 40 being released. The fan track liner 152 also accommodates gyroscopic effects, for example the rotation of an aircraft during take-off results in the radial displacement of the rotor that generates an asymmetric rub on the fan track liner 152. The rubbing of the tips of the fan blades 40 on the fan track liner 152 affects tight clearance between the fan blades 40 and the fan track liner 152 which improves the efficiency of the gas turbine engine. Thus, the gap allows for a strong containment fan case whilst compensating for normal movements the fan rotational envelope.

The fan track liner 152 has, in circumferential layers, an attrition liner 154, a honeycomb layer 158 and a septum 156. The septum 156 acts as a bonding layer between the attrition liner 154 and the honeycomb layer 158. The honeycomb layer 158 may be an aluminium honeycomb. The tips 42 of the fan blades 40 are intended to pass as close as possible to the fan track liner 152 when rotating. The attrition liner 154 is therefore designed to be abraded away by the fan 12 during initial operation and normal operational movements of the fan 12 to ensure the gap between the rotating fan blade tips 42 and the fan track liner 152 is as small as possible. The fan blades 40 effectively make their own 'track' or path in the attrition liner 154 when the engine 10 is first run up, thus the name 'fan track liner'. During normal operations of the gas turbine engine, ordinary and expected movements of the fan blade 40 rotational envelope cause abrasion of the attrition liner 154. This allows the best possible seal between the fan 12 and the fan track liner 152 and so improves the effectiveness of the fan 12 in driving air through the engine.

The purpose of the hook 160 is to ensure that, in the event that a fan blade 40 detaches from the rotor, the fan blade 40 will not be ejected through the front, or intake, of the gas turbine engine. During such a fan-blade-off event, the fan blade 40 travels rapidly outwards as a centripetal force no longer maintains the fan blade's rotational trajectory. Impact with the cylindrical containment portion 162 of the fan case 150 prevents the fan blade 40 from travelling any further in a radially outward direction. The fan blade 40 will also move forwards in an axial direction as the blade 40, although no longer retained in position on the rotor, responds to the reaction force acting on the blade 40 from the air passing through the fan 12. This axially forward and radially outward motion results in the leading edge 44 of the fan blade 40 colliding with the hook 160 in the region of the fan blade tip 42. Thus the fan blade 40 is captured by the hook 160 and further axially forward movement is prevented. The cylindrical containment portion 162 and hook 160 of fan case 150 therefore combine to contain the released fan blade 40. Thus the fan blade 40, or fragments thereof, are less likely to cause damage to structures outside of the gas turbine engine casings, in particular the aircraft fuselage itself.

As can be seen from FIG. 2, for the hook 160 to function effectively, a released fan blade 40 must penetrate a fan track liner 152 in order for its forward trajectory to intercept with the hook. If the released fan blade 40 does not penetrate the fan track liner 152 it may skip over the fan track liner 152, thus missing the hook 160 entirely, and exit from the front of the engine. An event where a fan blade exits from the front of the engine, or passes through the intake wall of the gas turbine engine, would be classed as an uncontained failure.

Ensuring that a fan blade will penetrate the fan track liner 152 is complicated by the fact that the fan track liner 152 must also be durable enough to withstand the rigours of normal operation without sustaining damage. This means the fan track liner 152 must be strong enough, for example, to withstand ice and other foreign object impacts without exhibiting damage.

SUMMARY OF INVENTION

It is an object of the invention to provide a fan containment system which ensures that the tip of a released fan blade will penetrate the fan track liner and thus be captured by the hook on the fan case.

According to an aspect of the present invention there is provided a fan containment system according to claim 1.

According to another aspect of the invention there is provided a fan assembly comprising a fan containment system as claimed in claim 1 and a radial array of fan blades mounted to a hub.

According to another aspect of the invention there is provided a gas turbine engine comprising a fan containment system as claimed in claim 1.

The fan containment system may have one of or, the extent that they are compatible, any combination of the following features.

The fan track liner may be removable from the fan case. The fan track liner may be bonded to the fan case.

The panel may be a resilient panel.

The panel may be fitted to the fan case. The panel may be bonded to the fan case. The panel may be supported by a foam-filled composite box bonded directly to the fan case. The panel may include a foam rubber block.

The panel may be fitted to the fan track liner. The panel may be fitted into a recess in the fan track liner. The recess may be a scallop. The panel may nest in the fan track liner.

The fan containment system may include a second fan track liner. The second fan track liner may be removable from the fan case. The second fan track liner may be bonded to the fan case. The second fan track liner may be positioned axially rearward of the fan track liner.

The panel may form a substantially continuous air washed surface with the fan track liner and the hook. The leading edge of the released fan blade may collide with the hook. The panel may be compressed by the fan blade tip and/or leading edge of the fan blade to allow the released fan blade to move radially outward. The released fan blade and/or fan blade tip may slice and/or cut through the panel to allow the released fan blade to move radially outward.

A step may be provided in the substantially air washed surface between the trailing edge of the panel and a radially inner surface of the fan track liner. The step may be approximately 3 mm.

The panel may comprise an elastomeric structure. The elastomeric structure may comprise an elastomer material. The elastomeric structure may be moulded elastomer. The elastomeric structure may be a cured silicone rubber. The elastomeric structure may be bonded to the septum layer.

The panel may comprise ribs. The ribs may be stiffened by inserts. The inserts may be carbon fibre. The inserts may be fabric inserts.

The ribs may be inclined in an axially forward direction. The ribs may define a plurality of voids.

The ribs may extend in a circumferential direction of the fan case. The ribs may extend in a generally radial direction of the fan case.

The panel may comprise axial ribs. The panel may comprise aligned ribs. The aligned ribs may be aligned with the trajectory of the released fan blade. The aligned ribs may be aligned with the trajectory of the fan blade tip of the released fan blade.

The panel may include a face sheet. The face sheet may comprise a plurality of strips. The strips may be inclined at an angle relative to a plane perpendicular to the axial direction of the gas turbine engine. The angle may match the angle of the trajectory of the fan blade tip of the released fan blade.

The face sheet may define a plurality of holes. The plurality of holes may align with the voids defined by the ribs. The plurality of holes may align with the trajectory of the fan blade tip of the released fan blade.

The face sheet may be fixed to the elastomeric structure. The face sheet may be fixed to the ribs. The face sheet may be fixed to the elastomeric structure by an adhesive bond.

The face sheet may comprise a thermoplastic material. The face sheet may comprise a glass fibre and resin composite material.

The face sheet may comprise a single sheet of material.

The panel may define pressure relief holes. The elastomeric structure may define the pressure relief holes.

The panel may be one segment of a circumferential array of like panel segments.

The panel may comprise a single component. The panel may extend around the entire circumference of the fan case. The single component may have a split at a is point along its circumference so that its diameter may be temporarily reduced.

DESCRIPTION OF THE DRAWINGS

The invention will now be described, by way of example only, with reference to the accompanying drawings in which.

DETAILED DESCRIPTION

Figure 1:
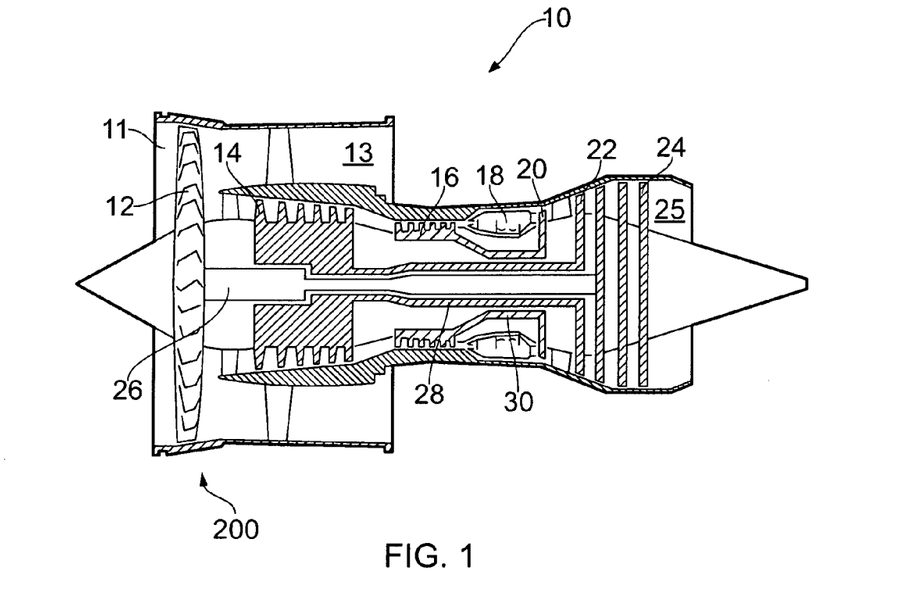
FIG. 1 is a cross-section through the rotational axis of a high-bypass gas turbine engine incorporating an embodiment of the present invention.

With reference to FIG. 1 a high-bypass gas turbine engine is indicated at 10. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

Figure 3:
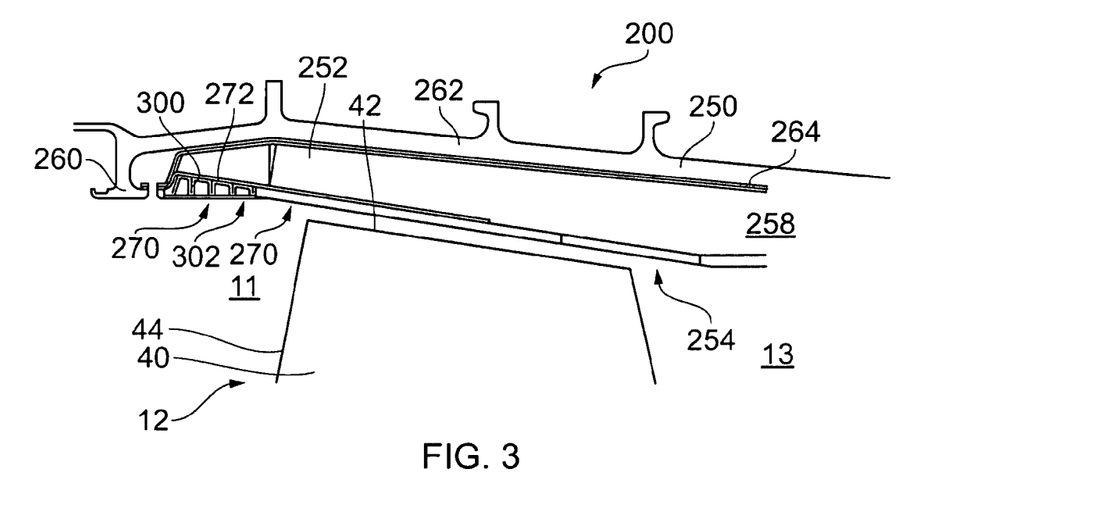
FIG. 3 is a partial view of the cross-section through and parallel to the rotational axis of the gas turbine engine of FIG. 1 showing a fan containment arrangement according to the present invention.

The intake fan 12 comprises an array of radially extending fan blades 40 that are mounted to the shaft 26. The shaft 26 may be considered a hub at the position where the fan blades 40 are mounted. FIG. 1 shows that the fan 12 is surrounded by a fan containment arrangement 200, or fan containment system, that also forms one wall or a part of the bypass duct 13. FIG. 3, which illustrates an example of the fan containment arrangement 200 in detail, shows that each fan blade 40 has a fan blade tip 42 and a leading edge 44.

By way of comparison, a conventional fan containment arrangement 100 is shown in FIG. 2 which is described above. When installed on a conventional gas turbine engine, the conventional fan containment arrangement 100 would occupy the same or a similar position that the fan containment arrangement 200 occupies on the gas turbine engine 10, which is indicated in FIG. 1. In a similar vein, a fan of a conventional gas turbine engine has the same or a similar structure to that of the intake fan 12 of the gas turbine engine 10; for this reason the same reference numerals are used to indicate the structure of the fan in FIG. 2.

FIG. 3 illustrates an example of the fan containment arrangement 200 according to the present invention. The fan containment arrangement 200 comprises a fan case 250. The fan case 250 further comprises a generally cylindrical containment portion 262 and a hook 260. The generally cylindrical portion 262 may be any suitable shape, for example frustoconical and/or a more complex shape in order to match as closely as possible the axial direction profile of the fan blade tips 42. The fan case 250 may be manufactured from a metal and may include other materials, for example, para-aramid synthetic fibres wrapped around the fan case 250.

The fan containment arrangement 200 has a fan track liner 252 disposed on a radially inner surface 264 of the cylindrical containment portion 262 of the face case 250. When fitted around the array of radially extending fan blades 40 the fan containment arrangement 200 forms a part of the bypass duct 13. The fan containment arrangement 200 includes a fan track liner 252 which is bonded directly to the fan case 250 in a similar vein to the fan track liner 152 discussed above. The fan track liner 252 may comprise an attrition liner 254, a septum 256 (not referenced in FIG. 3) and a honeycomb layer 258 in a similar manner to the arrangement described with respect to FIG. 2. The hook 260 is positioned in front of the array of fan blades 40 in the axial direction of the fan 12. The hook 260 projects in a generally radially inward direction.

The fan containment arrangement 200 includes a resilient panel 300 located forward of the fan blades 40 in the axial direction of the gas turbine engine 10. The resilient panel 300 is also located aft or rearward of the hook 260 in the axial direction. Thus, the resilient panel 300 is located between the fan blade leading edges 44 and the hook 260.

FIG. 3 shows that the resilient panel 300 defines a portion of the intake duct 11. The resilient panel 300 has a radially inner surface 302 which cooperates with the attrition liner 254 to form a substantially continuous air washed surface 270. The substantially continuous air washed surface 270 defines a part of the intake duct 11. The substantially continuous air washed surface 270 presents undisturbed air flow to the fan 12 and therefore minimises the loss of engine 10 efficiency due to the presence of multiple components defining the intake duct 11.

It is preferable that the resilient panel is located radially outward of the fan blade tips 42 in the same manner as the hook 260 and the fan track liner 252. This allows the intake duct 11 to remain free from obstruction to the air flow entering the engine 10. However, other arrangements may be conceivable depending on the desired profile of the intake duct 11 in the axial-direction of the engine 10 for other design reasons.

In the example of the fan containment system 200 shown in FIG. 3, the resilient panel 300 is shown attached to the fan track liner 252. In this instance the resilient panel 300 is accommodated in a recess 272 on the axially forward portion of the fan track liner 252. The recess 272 is arranged to receive the resilient panel 300 in a nesting fashion. The recess 272 may be alternatively described as a scallop in the front portion of the fan track liner 252. The resilient panel 300 may be bonded or mechanically fixed into the recess 272.

The resilient panel 300 is a temporarily deformable structure. This means that any force applied to the radially inner surface 302 of the resilient panel 300 results in the panel deforming to absorb the force. The resilient panel 300 then returns to its original shape.

In the event that smaller foreign objects enter the intake duct 11 they may strike the resilient panel 300 in addition to potentially striking the fan blades 40 and the other components of the fan containment system 200. Ice fragments are, as discussed above, the most common example of these smaller foreign objects which may be ingested by the engine 10.

Ice fragments (or other smaller foreign bodies) striking the resilient panel 300 will therefore have no impact on the structural integrity of the resilient panel 300. The temporarily deformable nature allows the resilient panel 300 to deform and absorb the impact of the ice and then return to its original shape after the impact. In effect, the ice fragments 'bounce off' the resilient panel 300.

In contrast to smaller foreign bodies and as discussed above, a larger foreign object, for example a bird, can cause the fan blade 40 to be released from the shaft 26. In such an event, the temporarily deformable nature of the resilient panel 300 improves the functionality of the fan containment system 200. As the released fan blade 40 moves axially forwards of the fan 12, the resilient panel 300 increases the likelihood that the fan blade tip 42 will move far enough outwards in the radial direction that the fan blade 40 will intercept with the hook 260 and therefore be retained within the engine 10.

A reason that the fan blade 40 will intercept the hook 260 is because the resilient panel 300 is temporarily deformable. Specifically, the temporary deformable nature of the resilient panel 300 means that it is either weak and/or soft enough, or compressible enough, that it does not inhibit the radial outward motion of the released fan blade 40 as it moves axially forward.

Equally, a resilient panel 300 being weak and/or soft enough, for example constructed of rubber as discussed below, means that the tip 42 or the leading edge 44 of the fan blade 40 slices through the resilient panel 300 during radially outward and axially forward motion of the released fan blade 40. Alternatively, compression of the resilient panel 300 may be caused by the impact of the tip 42 or the leading edge 44 of the released fan blade 40 and so allow the fan blade 40 to move far enough radially outwards so as to intercept the hook 260. In either case the hook 260 is exposed to the fan blade 40 as the resilient panel 300 does not present an obstacle.

This benefit can be obtained because the region of the intake duct 11 defined by the resilient panel 300 does not need to be hard enough that it can support the attrition liner 254. This is in contrast to the region of the fan track liner 252 which must provide the attrition liner 254 which is in an abradable relationship with the fan blade tips 42. Accordingly, although the fan track liner 252 is intended and designed to allow the penetration of the fan blade 40 if released, it must also be hard enough to provide the sealing function by supporting an abradable layer in the form of the attrition liner 254. This makes the structure of the fan track liner 252 a design of compromise, one where the hardness and rigidity of the attrition liner 254 must be balanced against the need of the liner 252 to allow the fan blade 40 to penetrate the fan track liner 252.

As the area of the intake duct 11 where the resilient panel 300 is located is axially forward of the fan 12 there is no need to provide an attrition liner 254. The resilient panel 300 is therefore able to be designed to absorb smaller impacts from ice fragments and the like, while not inhibiting the motion of the fan blade 40 when released due to the larger forces involved. In other words, these two functions of the resilient panel 300 are separable or isolated from each other, as the resilient panel 300 responds differently dependent on the force applied to it due to its structure and material selection, some examples of which are described below. As discussed above, because of the substantially continuous air washed surface 270 there is minimal loss of efficiency engine 10 due to presence of the resilient panel 300 in the intake duct 11.

Figure 4:
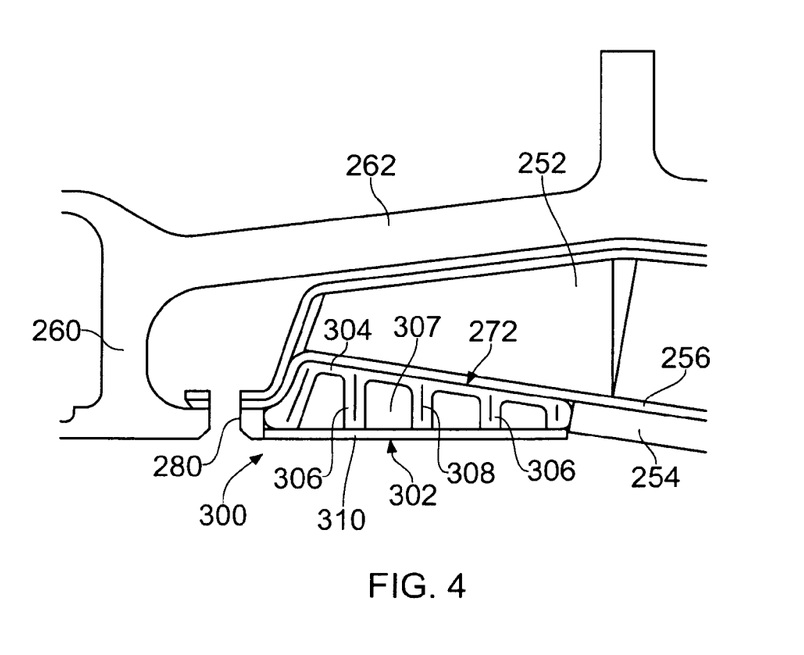
FIG. 4 is a detailed view of the cross-section of FIG. 3 showing an example of the structure of a resilient panel according to the present invention.

One option to make the resilient panel 300 a temporarily deformable structure is to fabricate the panel 300 with a material having elastomeric properties. An example of a resilient panel 300 fabricated in this manner is shown in FIG. 4. FIG. 4 is a detailed view of the region between the hook 260 and the fan 12 where the resilient panel 300 is located and accordingly shows one example of the structure of the resilient panel 300.

In the example of FIG. 4, the resilient panel 300 has an elastomeric structure 304 which forms the bulk of the body of the resilient panel 300. The elastomeric structure may comprise, for example, a moulded elastomer or a rubber or a cured silicone rubber. The elastomeric structure 304 may be bonded to the septum layer 256. FIG. 4 shows that the hook 260 defines an optional fixing hole 280 through which the fan track liner 252 may be supported and fixed to the fan case 250. Because in this example the resilient panel 300 is nested within the recess 272 of the fan track liner 252 it is also fixed to the fan case 250 via this fixing position.

The elastomeric structure 304 has a plurality of ribs 306 which extend in a generally radial direction and circumferential direction of the fan case 250. The ribs 306 define a plurality of voids 307 in the resilient panel. The ribs 306 may be formed by the moulding process where the elastomeric structure 304 is moulded so that a comb-like structure is formed. The ribs 306 stiffen the structure of the resilient panel 300 sufficiently such that it does not deform due to pressure differentials caused by the air flow in the intake duct 11 when the engine 10 is operating.

The pressure differentials or changes may occur as the engine 10 increases or decreases thrust output resulting in a change in flow volumes through the intake duct 11. A change in aircraft altitude may also change the pressure in the intake duct 11 and the resilient panel 300 must be resistant to shape and/or size changes. The resilient panel 300 must also be stiff enough to cope with the changes in pressure in regions of the intake duct 11 due to the passing fan blades 40 of the fan 12.

Furthermore, pressure differentials may also arise between the intake duct 11 and the voids 307 behind (radially outwards of) the resilient panel 300 which may deform the panel 300 in a similar way. Any deformation due to pressure differentials in the intake duct 11 will alter the axial direction cross-sectional profile of the radially inner surface 302 and therefore the profile of the air washed surface 270. A change shape of the annulus of the intake duct 11 caused by a change in the profile would be detrimental to the performance and efficiency of the engine 10 by increasing the specific fuel consumption of the engine 10 due to the losses incurred in the altered intake duct 11. A change in the cross-sectional profile of the radially inner surface 302 may also be damaging to the engine 10 because a change in the excitation modes of the fan 12 may be induced.

Optionally, the each of the ribs 306 is stiffened by respective inserts 308. This will improve the performance of the structure in resisting deformation of the radially inner surface 302 due to pressure differentials. The inserts 308 may be constructed from carbon fibre or fabric. The inserts 308 may be moulded with the elastomeric structure or inserted into cavities in the rib 306 on manufacture.

As illustrated in FIG. 4, the resilient panel 300 may additionally include a face sheet 310 which defines the radially inner surface 302 of the panel 300. This is in contrast to certain applications, of the fan containment arrangement 200 to engines 10, where it may be preferable to define the radially inner surface 302 of the resilient panel 300 solely by the elastomeric structure 304, i.e. where the radially inner surface 302 is defined by a wall of the elastomeric structure and the face sheet 310 is absent. Where a wall of the elastomeric structure 304 defines the radially inner surface 302, a film (not shown in figures) may be laid over, or embedded in, the wall so as to provide some protection to the elastomeric structure 304 by way of resistance to erosion from foreign objects.

The face sheet 310 may be fixed to elastomeric structure 304 and the fixing may include fixing the face sheet 310 to the ribs 306. Fixing the face sheet 310 to the elastomeric structure 304 and/or ribs 306 may be by an adhesive bond. Fixing the face sheet 310 to the ribs 306 ensures that the ribs 306 deform in a coordinated or cooperative manner with each other, i.e. they will deform in the same direction if the resilient panel 300 is struck by an object. Thus, ribs 306 offer low resistance to the released fan blade 40 once it has penetrated the face sheet 310, or pushes the face sheet 310 out of the way, as the released fan blade 40 travels radially outwards and axially forwards. It may be preferable to provide a large number of very thin ribs 306 so that the elastomeric structure is more comb-like. A large number of thin ribs 306 may improve support of the face sheet 310 and encourage the ribs 306 to act in a 'domino-like' manner in the event the resilient panel 300 is struck by the fan blade tip 42 of the released blade 40.

The ribs 306 and face sheet 310 cooperate to increase the structural stability of the resilient panel 300 and so further reduce the likelihood of pressure differential forced deformation as described above. Additionally, as the structure of the ribs 306 and face sheet 310 stiffens the resilient panel 300, the elastomeric structure 304 and face sheet 310 may be fabricated to complement each other and thus provide the preferred level of deformability/stiffness of the resilient panel 300 so as to resist the smaller object strikes and offer minimal resistance to a released fan blade 40.

In a further benefit, the presence of the face sheet 310 may provide resistance to erosion from the smaller foreign object strikes encountered by the engine 10 in day-to-day use. In other words the elastomeric structure 304 is protected from erosion by the radially inner face sheet 310. This may prolong the useful life of the resilient panel 300 and reduce the need for maintenance and replacement.

Figure 4A:
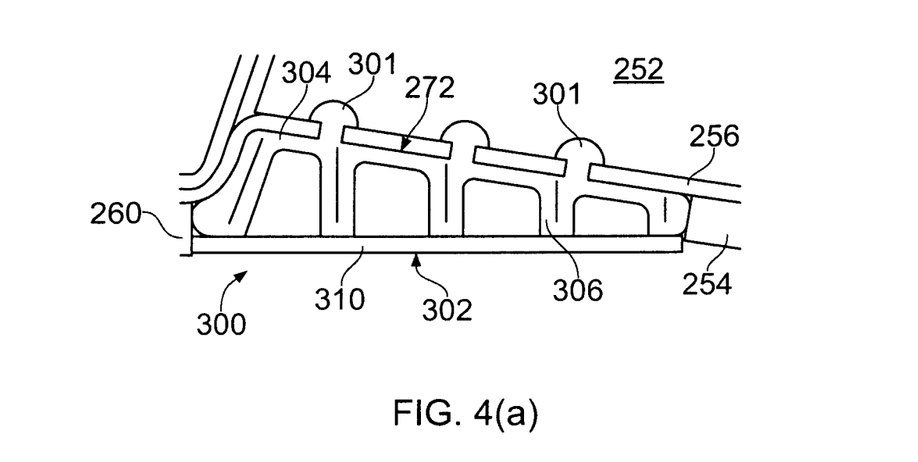
FIG. 4(a) is another detailed view of the cross-section of FIG. 3 showing an example of the structure of a resilient panel according to the present invention.
Figure 4B:
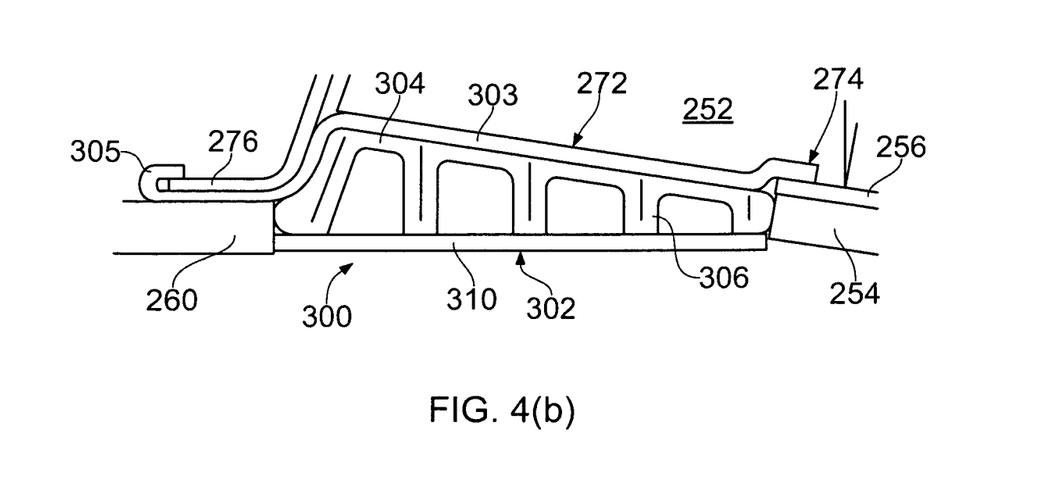
FIG. 4(b) is another detailed view of the cross-section of FIG. 3 showing an example of the structure of a resilient panel according to the present invention.

FIGS. 4(a) and 4(b) show alternative methods of restraining the resilient panel 300 in the recess 272 in the fan track liner 252. Both examples depicted in FIGS. 4(a) and 4(b) show the elastomeric structure 304 including the face sheet 310; however, the face sheet 310 may be excluded from the structure of the resilient panel 300, as discussed above, so that the radially inner surface 302 is defined by a wall of the elastomeric structure 304.

FIG. 4(a) shows the resilient panel 300 may be fixed to the fan track liner 252 by discrete location pips 301. The location pips 301 may be fitted through complementary holes in the septum 256 or a similar dividing wall. The location pips 301 then retain the resilient panel 300 within the recess 272 by way of mushroom heads on the pips 301. The location pips 301 may be integrally moulded with the elastomeric structure 304. This option allows the resilient panel 300 to be removed from the fan track liner 252, and thus the engine 10, independently of the fan track liner 252. This may be beneficial for maintenance where the resilient panel 300 has sustained damage and needs to be repaired or replaced.

Another example of fixing the resilient panel 300, as shown in FIG. 4(b), includes a substrate 303 on which the resilient panel 300 may be mounted in the recess 272. The elastomeric structured may be joined to the substrate 303 so that the panel 300 is retained in the fan track liner 252. The substrate 303 is fitted to a slot 274 in the recess 272 of the fan track liner 252. As illustrated in FIG. 4(b) the slot 274 is located in the axially rearward direction of the engine 10, but the slot 274 may be located in an axially forward location. At the opposing end of the substrate 303 the resilient panel 300 is retained by a snap on clip 305 which fits, or snaps, over a flange 276 of the recess 272 in the fan track liner 252. The effect is that the resilient panel 300 is retained in the fan track liner 252. The arrangement shown in FIG. 4(b) allows easier replacement of the resilient panel 300 on the fan track liner 252.

The face sheet 310 may be manufactured from a thermoplastic material for example. Alternatively, a glass fibre and epoxy resin composite construction may be used to construct the face sheet 310.

Figure 5:
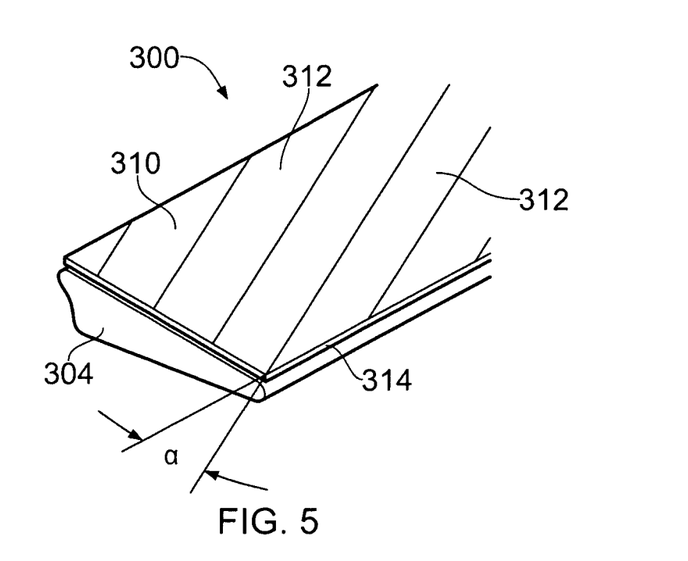
FIG. 5 is a perspective view of an example of a resilient panel according to the present invention.

The face sheet 310 may be made from a single sheet of material. Alternatively, and as shown in FIG. 5, the face sheet may be constructed of a plurality of strips 312 of the chosen material. The strips 312 abut each other on their respective edges so as to make up the entire face sheet 310.

Fabricating the face sheet 310 in this way is beneficial in that it allows the face sheet 310 to locally flex in response to object impacts of the type described above, in particular ice fragments, in the local area of the object strike. In other words, each of the strips 312 impacted by an object may react to the object strike in combination with the underlying elastomeric structure 304 but independently of the neighbouring strip 312. In this way a greater portion of the energy of the object strike may be transmitted to, and therefore absorbed by, the elastomeric structure 304, than the face sheet 310. The overall effect is to reduce the stiffness of the face sheet 310 and therefore reduce the likelihood that the sheet 310 will suffer local fractures caused by repeated object strikes. Furthermore, fabricating the face sheet 310 by way of the strips 312 increases the likelihood that fan blade tip 42 or leading edge 44 of the fan blade 40 will move radially outward enough to collide with the hook 260

Optionally the strips 312 may be inclined at angle α measured relative to a plane perpendicular to the axial direction of the engine 10. The inclination of the strips at angle α is therefore shown in FIG. 5 as measured relative to a circumferential edge 314 of the face sheet 310, the circumferential edge 314 coinciding with a plane perpendicular to the axial direction of the engine 10.

Angle α may be arranged to match the angle of the trajectory of the fan blade tip 42 of the fan blade 40 if released from the shaft 26, measured relative to the plane of rotation of the fan 12. Thus the plurality of strips 312 may be inclined to coincide with the trajectory of the fan blade tip 42 of the released fan blade 40. In other words, the angle α matches the path of the fan blade tip 42 across the radially inner surface 302 if released from the shaft 26.

Aligning the strips 312 with the trajectory of the fan blade tip 42 increases the likelihood further still that fan blade tip 42 or leading edge 44 of the fan blade 40 will move radially outward enough to collide with the hook 260, either by compressing the resilient panel 300 or penetrating the face sheet 310 and elastomeric structure 304.

Figure 6:
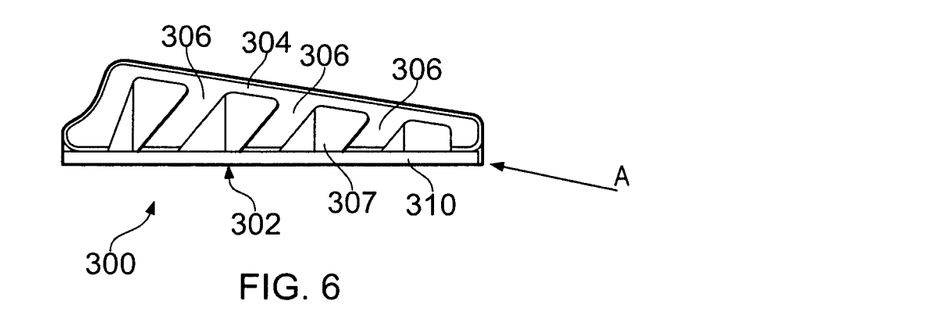
FIG. 6 is a cross-section parallel to the rotational axis of the gas turbine engine and through another example of a resilient panel according to the present invention.

In a further embodiment, the ribs 306 may be optionally inclined in an axially forward direction of the engine 10. Thus, as is shown by FIG. 6, where inclined in this manner, the ribs 306 are arranged to be at an angle to a plane perpendicular to the axis of the engine 10. This contrasts with the ribs 306 as shown in FIG. 4, which are arranged to be substantially in a plane in the circumferential direction of the fan case 250. Inclining the ribs 306 in this manner facilitates their collapse, in forward and radially outward directions, in the event that the released fan blade 40 contacts the resilient panel 300 and so increased the likelihood of the fan blade 40 contacting the hook 260. The trajectory of the released fan blade 40 is indicated by arrow A in FIG. 6. The inclined ribs 306 may collapse one-after-another in a domino-like effect. Alternatively, the ribs 306 may all collapse simultaneously due to the distributed force applied on them by the face sheet 310.

Figure 6A:
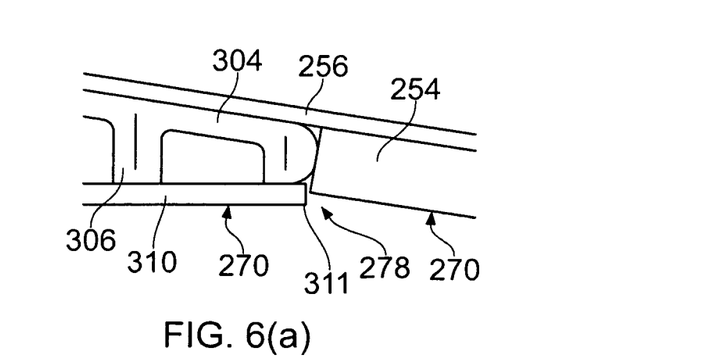
FIG. 6(a) is a detail view of a cross-section parallel to the rotational axis of the gas turbine engine and through another example of a resilient panel according to the present invention.

Optionally, a step 278 may be provided between a trailing edge 311 of the face sheet 310 (or alternatively, the wall providing the radially inner surface 302) and the neighbouring attrition liner 254 of the fan track liner 252. An example of such an arrangement is shown in FIG. 6(a). The trailing edge 311 corresponds to the rearward point of the resilient panel 300 in the axial direction of the engine 10. The step 278 can be described as being 'out of the wind' from the gas flow through the engine 10. Thus, the step 278 breaks up the substantially continuous air washed surface 270 by a small amount; however, this is not overly-detrimental to the performance and/or efficiency of the engine 10. It is expected that no substantial loss of performance and/or efficiency will be experienced if the maximum measurement of the step 278 is maintained at no more than approximately 3 mm between the immediately neighbouring surfaces making up the substantially continuous air washed surface 270. The advantage of providing the step 278 is that the fan blade tip 42 of the released bladed 40 is more likely to cut under the face sheet 310 and then cut through the ribs 306. The step 278 may induce the released fan blade 40 to strip the face sheet 310 off the elastomeric structure 304.

Figure 7A:
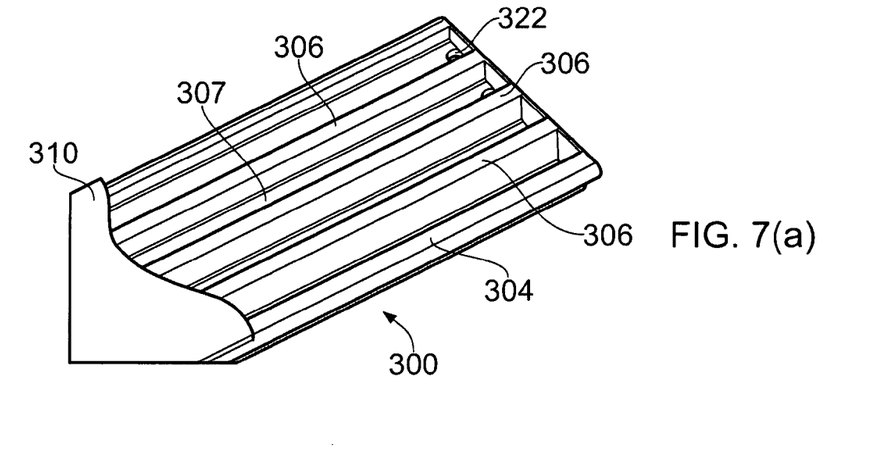
FIG. 7(a) is a perspective view of a further example of a resilient panel according to the present invention.
Figure 7B:
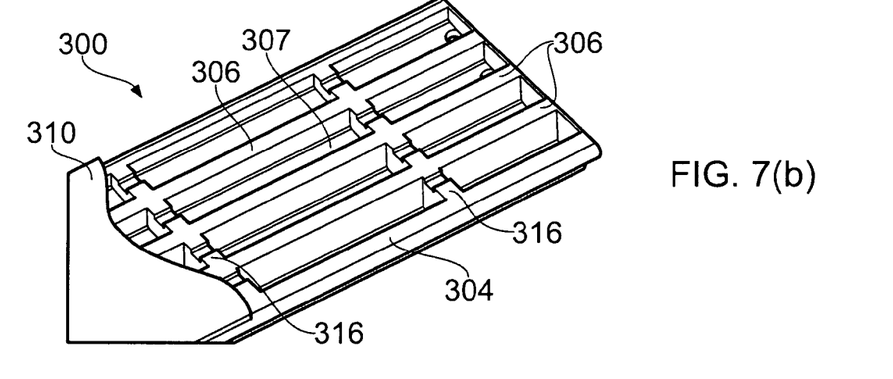
FIG. 7(b) is a perspective view of a further example of a resilient panel according to the present invention.
Figure 7C:
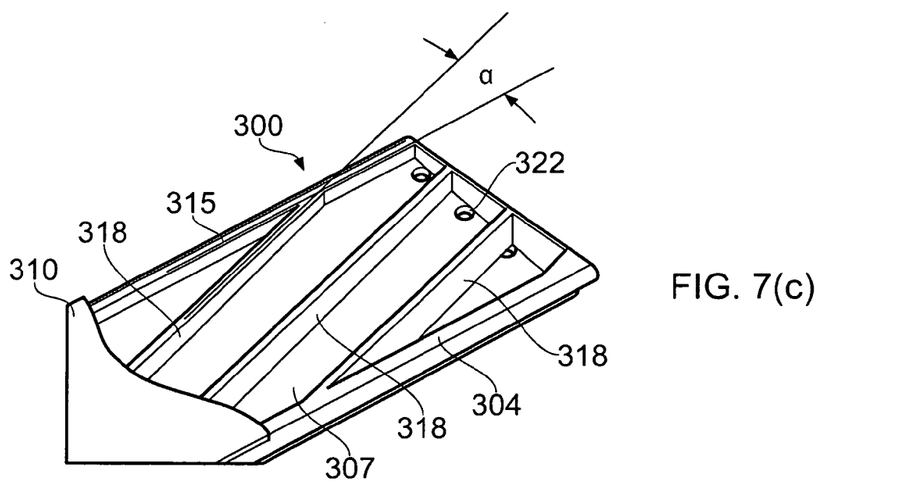
FIG. 7(c) is a perspective view of a further example of a resilient panel according to the present invention.

FIGS. 7(a), 7(b) and (c) illustrate alternative arrangements of rib 306 structure of the elastomeric structure 304. The face sheet 310 has been partially hidden to show the ribs 306 clearly. FIG. 7(a) shows the plurality of ribs 306 extending in a circumferential direction of the fan case 250 as described above.

FIG. 7(b) shows additional axial ribs 316 which extend in the axial direction of the engine 10. In this instance the axial ribs 316 are substantially perpendicular to the ribs 306 so as to form a lattice of the voids 307 or cells in the resilient panel 300; however, the axial ribs 316 may be applied to other embodiments such as that illustrated in FIG. 7(c) so as to form differently shaped cells.

FIG. 7(c) shows aligned ribs 318 which are aligned to the trajectory of the fan blade tip 42 of the released fan blade 40 in a similar manner as described above with respect to FIG. 5. Similarly, the angle α, which indicates the angle between the ribs 318 and the circumferential edge 315, matches the angle of the trajectory of the fan blade tip 42 in the same way as described above with respect to the strips 312. This may improve penetration of the released fan blade 40 into the resilient panel 300.

FIGS. 7(a) and 7(c) show that the ribs 306, 318 create elongated voids 307, or cells, in and between the elastomeric structure 304 and the face sheet 310. In the example of FIG. 7(a), the voids 307 extend in a circumferential direction commensurate with direction of the ribs 306.

Figure 8:
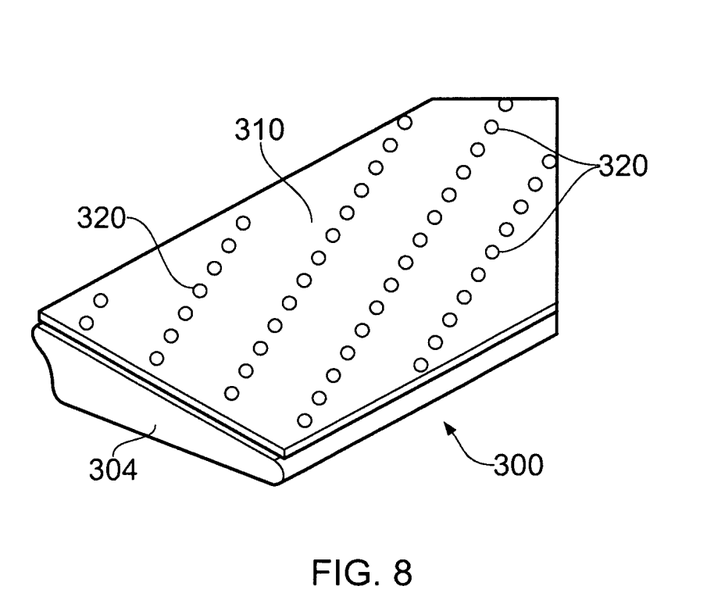
FIG. 8 is a perspective view of a further example of a resilient panel according to the present invention.

In addition to, or independently of, the above structural assembly, the face sheet 310 may define a plurality of holes 320. In FIG. 8, a linearly arranged array of the holes 320 is shown. The array of the holes 320 may align with the voids 307 or cells formed in and between the elastomeric structure 304 and the face sheet 310. In the example of FIG. 8 the holes 320 are aligned with the voids 307 created by the aligned ribs 318 of the sort described above with respect to FIG. 7(c). For example, the array of holes 320 may be aligned with the angle of trajectory of the released fan blade 40. However, other alignment arrangements are possible, for example, a linearly arranged array of the holes 320 which is aligned with the circumferentially extending voids 307 as illustrated in FIG. 7(a).

The holes 320 may be beneficial in attenuating noise emissions from the engine 10 in a similar manner to acoustic panels, as commonly used elsewhere in gas turbine engines, because the holes 320 allow the voids 307 or cells behind the face sheet 310 to be in fluid communication with the intake duct 11. The holes 320 may be particularly effective in attenuating noise emissions as the resilient panel 300 is located just in front of the fan 12 in the axial direction of the gas turbine engine 10.

Furthermore, the plurality of holes 320 may also improve the likelihood of the released fan blade 40 penetrating the resilient panel 300. This is due to the of the local weakness the holes 320 induce in the face sheet 310 in the region of each hole 320.

The elastomeric structure may include pressure relief holes 322. The pressure relief holes 322 are shown in FIGS. 7(a), (c) and FIG. 9. The pressure relief holes 322 minimise the risk of inflation and/or deflation of the resilient panel 300 due to expected pressure changes in the intake duct 11. The pressure changes occur when the engine 10 increases and/or decreases thrust output requiring a change in the mass of air, and consequently air pressure, flowing through the intake duct 11. Pressure changes in the intake duct 11 can also be expected when the aircraft, on which the engine 10 is mounted, changes altitude. Inflation and/or deflation of the resilient panel 300 may alter the profile and/or shape of the radially inner surface 302, i.e. the airwashed surface of the resilient panel 300, which may be detrimental to the efficiency/performance of the engine 10 or induce undesirable vibrations in the fan blades 40 of the fan 12.

The pressure relief holes 322 must be positioned on the resilient panel 300 so that the chance of ingress and subsequent freezing of water is minimised. Were frozen water to be present within any cavities or voids 307 of the resilient panel 300 during engine 10 operation, then the fan blade 40, if released from the shaft 26, may be prevented from penetrating or compressing the resilient panel 300 and thus fail to collide with the hook 260. Thus any water finding its way into the resilient panel 300 must, as far as possible, be allowed to drain away so as not to pool in the voids 307.

Frozen water trapped within the resilient panel 300 may also distort the profile and/or shape of the radially inner surface 302. As with the undesirable inflation/deflation of the resilient panel 300 discussed above, such distortion may be detrimental to the efficiency/performance of the engine 10 or induce undesirable vibrations in the fan blades 40 of the fan 12.

FIGS. 5, 7(a), 7(b), 7(c), 8 and 9 show examples of the resilient panel 300 in segment form. That is the resilient panel 300 is one of an array of resilient panels 300 arranged circumferentially around the fan 12 forming one element of the fan containment system 200. Providing the resilient panel 300 in segment form allows the resilient panels 300 to be assembled with the fan track liner 252. In the example shown in FIGS. 3 to 9 the resilient panels 300 extend circumferentially to the same extent that the fan track liner 252 segments extend circumferentially around the fan case 250.

Figure 9:
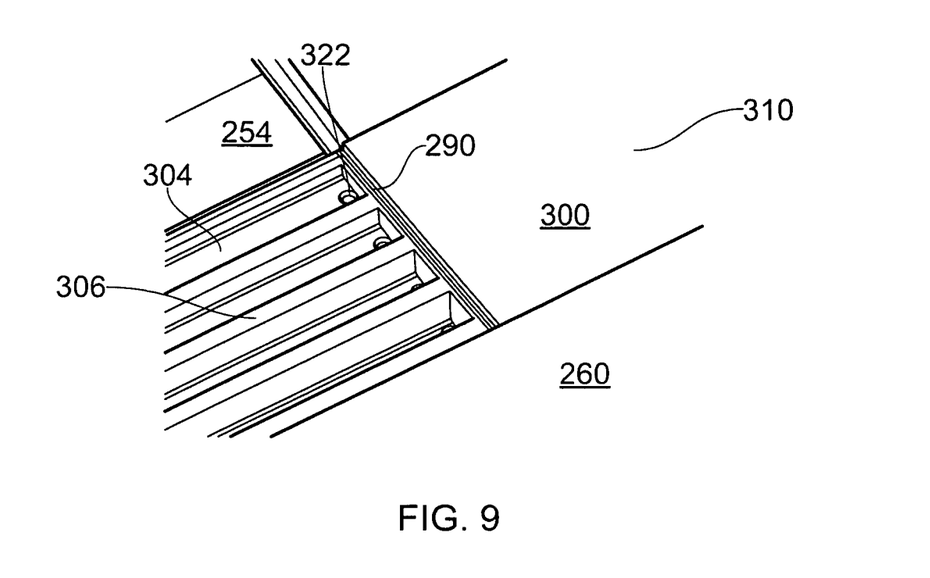
FIG. 9 is a perspective view of a fan containment arrangement incorporating an embodiment of the present invention.

FIG. 9 shows a detailed view of two such abutting resilient panel 300 segments looking rearwards from the hook 260. Once of the panels 300 is shown without the face sheet 310. A rubber seal 290 is provided between the respective edges of the resilient panels 300 is order to seal the intake duct 11 and prevent losses that would impact on efficiency of the engine 10.

Figure 10:
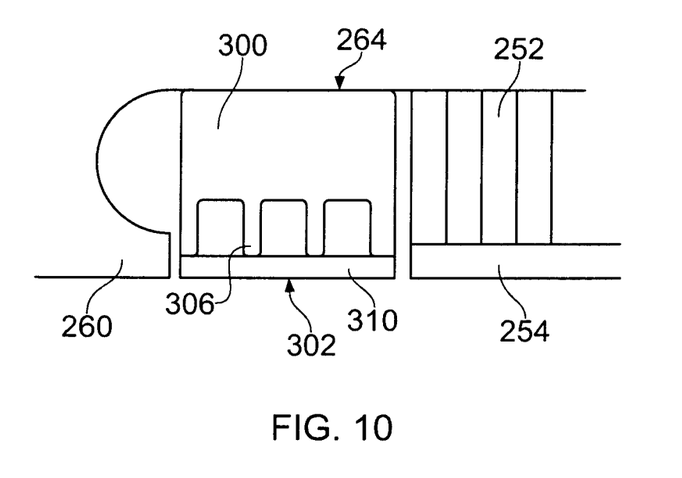
FIG. 10 is a detail view of a cross-section of an example of a fan containment arrangement according to the present invention.

In the examples above the resilient panel 300 is fitted to the recess 272 of the fan track liner. However, the resilient panel 300 may be fitted to the fan case 250 entirely independently of the fan track liner 252 as a completely separate component of the fan containment system 200. This may be beneficial in improving maintenance requirements by allowing independent replacement of the fan track liner 252 and the resilient panel 300. The resilient panel 300 may be bonded directly to, or mechanically fixed, to the fan case 250. Alternatively, where the resilient panel 300 is fitted to the fan case 250, it may be supported an intermediary component such as, for example, a foam-filled composite box 330. One arrangement, where the resilient panel 300 is fitted to the fan case 250 and supported by the foam-filled box 330, is shown in FIG. 10. In this instance the resilient panel 300 is bonded to the foam-filled composite box 330. Alternatively, the resilient panel 300 could be fixed to the composite box 330 by the location pips 301 as described with respect to FIG. 4(a). A honeycomb structure may alternatively be used in the place of the foam-filled box 330.

In another example, FIG. 10 shows the resilient panel 300 bonded to the radially inner surface 264 of the cylindrical containment portion 262. The resilient panel 300 illustrated in FIG. 10 is structured from a foam rubber block which is integrally moulded with the remaining portion of the resilient panel 300. Alternatively, a separate foam rubber block may be bonded to the remainder of the resilient panel 300 and bonded to the radially inner surface 264 of the cylindrical containment portion 262. The structure in FIG. 10 includes the ribs 306 and face sheet 310; however, these may be omitted from the structure of the resilient panel 300. For example, as with the examples described above, a wall may define the radially inner surface 302 of the resilient panel 300.

Where the resilient panel 300 is independently assembled to the fan case 250, or to the fan track liner 250 after the later has been assembled to the fan case 250, it is not necessary that the resilient panel 300 extends circumferentially to the same extent as the fan track liner 252. The circumferential length of the resilient panel 300 can be independently determined of the other components.

Although it is expected that ease of assembly will require that the resilient panel 300 is assembled to the fan case 250/fan track liner 252 in segment form, the resilient panel 300 may alternatively be constructed as a single component which extends entirely around the circumference of the fan case 250/fan track liner 252. A resilient panel 300 arranged as a single component may require a split at a point along its circumference so that its diameter may be temporarily reduced by allowing the ends of the resilient panel 300 at the split to pass over each. This would therefore allow the resilient panel 300 to be fitted into the fan case 250 behind the hook 260. A resilient panel 300 encircling the circumference of the fan case 250 in this manner would function to absorb object impacts whilst allowing the fan blade 40 to collide with the hook 260 in the same manner as described above.

The fan containment arrangement 200 is envisioned to be suitable for use on gas turbine engines 10 where the fan blades 40 of the fan 12 are manufactured from any material, for example either metals and/or composite materials. Both composite fan blades 40 and metal fan blades 40 are expected to be effectively contained by the fan containment system 200, as described above.

It will be appreciated by one skilled in the art that, where technical features have been described in association with one embodiment, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

We claim:

1. A fan containment system arranged to be fitted around an array of radially extending fan blades mounted on a hub in an axial gas turbine engine, each fan blade having a respective fan blade tip, the fan containment system comprising:
    a generally cylindrical fan case including a hook, the hook projecting in a generally radially inward direction and positioned axially forward of the radial array of fan blades when the fan containment system is fitted around the radial array of fan blades;
    a fan track liner disposed on the radially inner surface of the fan case; and
    a panel which is fitted into a recess in the fan track liner is positioned axially rearward of the hook and positioned axially forward of the radial array of fan blades when the fan containment system is fitted around the radial array of fan blades such that the panel forms a substantially continuous air washed surface with the fan track liner
    wherein the panel is configured to be temporarily deformable so as to absorb the impacts of any foreign bodies, which enter the gas turbine engine in use and strike the panel, without compromising the structural integrity of the panel while being weak enough so that in the event that, during operation of the gas turbine engine, one of the fan blades is released from the hub, the fan blade tip of the detached fan blade is not inhibited from moving radially outward of the hub by the panel and so increases the likelihood that the fan blade collides with the hook and is retained in the gas turbine engine.

2. A fan containment system as claimed in claim 1, wherein the panel comprises an elastomeric structure.

3. A fan containment system as claimed in claim 2, wherein the elastomeric structure comprises an elastomer material.

4. A fan containment system as claimed in claim 1, wherein the panel comprises ribs.

5. A fan containment system as claimed in claim 4, wherein the ribs are stiffened by inserts.

6. A fan containment system as claimed in claim 4, wherein the ribs are inclined in an axially forward direction.

7. A fan containment system as claimed in claim 1, wherein the panel includes a face sheet.

8. A fan containment system as claimed in claim 7, wherein the face sheet comprises a plurality of strips.

9. A fan containment system as claimed in claim 8, wherein the strips are inclined at an angle relative to a plane perpendicular to the axial direction of the gas turbine engine.

10. A fan containment system as claimed in claim 9, wherein the angle matches the angle of a trajectory of the fan blade tip of the released fan blade.

11. A fan containment system as claimed in claim 7, wherein the face sheet defines a plurality of holes.

12. A fan containment system as claimed in claim 1, wherein the panel defines pressure relief holes.

13. A fan containment system as claimed in claim 1, wherein the panel is one segment of a circumferential array of like panel segments.

14. A fan containment system as claimed in claim 1, wherein the panel extends around the entire circumference of the fan case.

15. A fan assembly comprising a fan containment system as claimed in claim 1 and a radial array of fan blades mounted to a hub.

16. A gas turbine engine comprising a fan containment system as claimed in claim 1.

* * * * *